United States Patent [19]

Logothetis

[11] 4,065,613
[45] * Dec. 27, 1977

[54] ALTERNATING COPOLYMERS OF ALKYL ACRYLATE/ETHYLENE/BRANCHING AGENTS

[75] Inventor: Anestis Leonidas Logothetis, Louisville, Ky.

[73] Assignee: E. I. Du Pont de Nemours and Company, Wilmington, Del.

[*] Notice: The portion of the term of this patent subsequent to Dec. 9, 1992, has been disclaimed.

[21] Appl. No.: 559,169

[22] Filed: Mar. 17, 1975

[51] Int. Cl.² .................. C08F 18/00; C08F 20/00; C08F 222/00; C08F 20/10

[52] U.S. Cl. .................. 526/292; 260/42.34; 260/47 UA; 260/79.5 C; 260/895; 260/899; 526/218; 526/272; 526/318; 526/320; 526/324; 526/329

[58] Field of Search ........ 260/78.5 R, 47 UA, 78.5 T, 260/79.7, 80.8, 80.81, 78.5 BB, 79.5 C, 80.7 S, 85.5, 86.7, 80.73; 526/272, 324, 329, 320, 318, 292

[56] References Cited

U.S. PATENT DOCUMENTS

| 2,599,123 | 6/1952 | Pickney | 260/78.5 |
| 2,783,212 | 2/1957 | Schnell | 260/78.5 BB |
| 2,985,625 | 5/1961 | Jones | 260/78.5 BB |
| 3,183,217 | 5/1965 | Sernivk et al. | 260/85.5 |
| 3,393,168 | 7/1968 | Johnson | 260/78.5 BB |
| 3,413,272 | 11/1968 | Rees | 260/78.5 |
| 3,501,445 | 3/1970 | Faust et al. | 260/86.1 |
| 3,647,771 | 3/1972 | Nakaguchi | 260/86.7 |
| 3,793,262 | 2/1974 | Logothetis | 260/86.7 |
| 3,814,734 | 6/1974 | Kawasumi et al. | 260/63 R |
| 3,925,326 | 12/1975 | Logothetis | 260/78.5 R |
| 3,957,732 | 5/1976 | Hirooka et al. | 526/90 |

FOREIGN PATENT DOCUMENTS 1,123,723 8/1968 United Kingdom .................. 260/63

Primary Examiner—Herbert J. Lilling

[57] ABSTRACT

An amorphous atactic alternating branched copolymer having a glass transition temperature less than about 0° C., said copolymer having repeating units of —A—B— wherein A is a polymerized unit derived from a compound containing the group

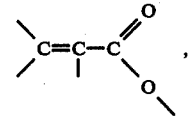

and where B is a polymerized unit derived from a compound containing the group $CH_2=C<$.

3 Claims, No Drawings

ALTERNATING COPOLYMERS OF ALKYL ACRYLATE/ETHYLENE/BRANCHING AGENTS

THE INVENTION

This invention is an alternating copolymer of an alkyl acrylate, ethylene, and a branching agent. Optionally, cure-site monomers can be added.

Ethylene-alkyl acrylate copolymers are well known in the art, but in the unvulcanized state the polymers have undesirable flow properties. The unvulcanized polymers have a high cold flow. Generally, the unvulcanized polymers are shipped in containers as small pieces. After a short period of time the small pieces, due to their high cold flow properties, flow together to form a large mass of polymer. This is undesirable because the large mass is difficult to handle in subsequent mixing operations leading to the vulcanization of the polymer. The addition of a branching agent improves the rheological properties of the polymer, i.e., raises the viscosity and thus improves cold flow. When a branching agent is present in the polymer, the small pieces of polymer do not tend to flow together to form a large mass.

Ethylene copolymers have low resistance to hydrocarbon oils. Alkyl acrylate polymers are resistant to oils and oxidation, but their low temperature properties are unsatisfactory for certain uses because they become brittle and crack. Ethylene copolymers containing only 10-20 mole percent alkyl acrylates are also known, but they have low resistance to hydrocarbon oils. However, a 50 mole percent acrylate monomer containing ethylene copolymer, optionally including cure-site monomers, gives a combination of good low temperature properties and satisfactory oil, thermal, and oxidation resistance.

SUMMARY OF THE INVENTION

This invention relates to an amorphous, atactic, alternating, branched copolymer having a glass transition temperature less than 0° C., said copolymer having repeating units of

—A—B— wherein A is a polymerized unit derived from a compound containing the group

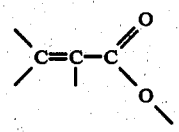

and selected from the group consisting of:
1. an alkyl acrylate in which the alkyl group has from 1-8 carbon atoms,
2. a diacrylate having the following structure:

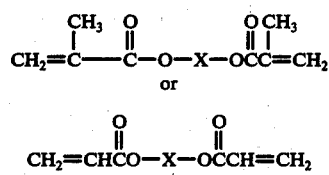

where X is: (a) $-(CH_2)_n-$ n = 1-20, or

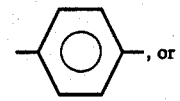  R = $C_1-C_8$ alkyl or   (b)

$C_6-C_{20}$ aryl, or

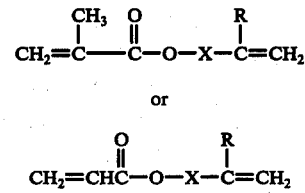, or   (c)

d. $-(CH_2CH_2O)_nCH_2CH_2-$ n = 1-100;

3. an olefin-acrylate having the following structure:

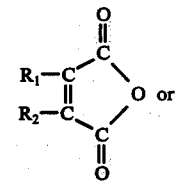

or

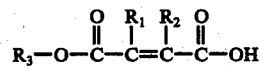

where X is: $-(CH_2)_n-$ n = 1-20 where R is:
a. H, or
b. $C_1-C_8$ alkyl, or
c. $C_6-C_{20}$ aryl;

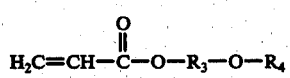   (4)

wherein
$R_1$ and $R_2$ are independently selected from H, Cl, Br, a $C_1-C_8$ alkyl, phenyl, or naphthyl, and $R_3$ is hydrogen, $C_1-C_{10}$ alkyl, phenyl or naphthyl, substituted phenyl or naphthyl where substituents are alkyl $C_1-C_{10}$, halogen, nitro, and $C_1-C_{10}$ alkoxy groups;

$$H_2C=CH-\overset{O}{\underset{\|}{C}}-O-R_3-O-R_4$$   (5)

wherein
$R_3$ is a $C_1-C_4$ alkylene, and
$R_4$ is phenyl, naphthyl, thiophenyl, or $C_1-C_4$ alkyl substituted derivatives thereof;

$$CH_2=CH-\overset{O}{\underset{\|}{C}}-O-CH_2CH_2X,$$   (6)

where X is Cl, Br, or F;
and wherein B is a polymerized unit derived from a compound containing the group $CH_2=C<$ and selected from the group consisting of:
7. ethylene;
8. a diolefin having the following structure:

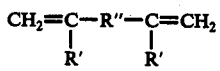

where R' is
a. H, or
b. $C_1-C_8$ alkyl, where R" is: (a) $+CH_2+_n$ n = 1-10

(b) 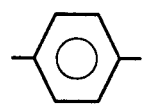

(c) 

(d) 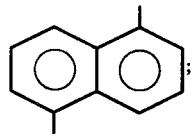

9. an olefin-acrylate having the following structure:

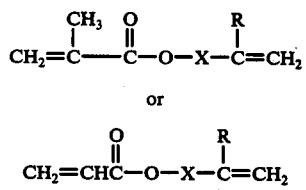

where X is: $+CH_2+_n$ n = 1-20 where R is:
a. H, or
b. $C_1-C_8$ alkyl, or
c. $C_6-C_{20}$ aryl.

10. $CH_2=CHX$, $CH_2=CX_2$, or $CH_2=CH-CH_2X$, where X is Cl or F;

$$CH_2=CH-O-\overset{O}{\underset{\|}{C}}-CH_2X,\quad (11)$$

where X is Cl, Br, or F; the total amount of on or more of (2), (3), (8), and (9) present is 0.05 to 5 mole percent; the amount of (4), (5) (6), (10), or (11) present is either none or 1 to 10 mole percent; and the amount of (1) and (7) present is complemental.

When branched, the unvulcanized copolymers of this invention have improved rheological properties such as improved cold-flow. When cured, the copolymers of this invention are resistant to oil, oxidation, and thermal degradation.

The copolymers of this invention contain ethylene and an alkyl acrylate wherein the alkyl is a hydrocarbon group having 1 to 8 carbon atoms, preferably 2-8 carbon atoms. Representative alkyl acrylates are methyl acrylate, ethyl acrylate, and butyl acrylate. Preferred alkyl acrylates are ethyl acrylate and butyl acrylate.

The copolymers are amorphous and atactic. Amorphous means, noncrystalline, having no determinable form or crystalline structure, e.g., glass. Atactic means a type of molecule in which substituent groups or atoms are arranged randomly above and below the backbone chain of atoms, when the latter are arranged so as all to be in the same plane.

The copolymers also contain direactive branching agents which improve the flow properties of the unvulcanized elastomer without increasing solution viscosity. The branching agent is added prior to copolymerization. Preferred branching agents are set forth below. Mixtures of branching agents can also be used, but in the preferred embodiment only one branching agent is present. Each type of branching agent set forth below will preserve the alternating character of the polymer.

The first group of branching agents are diacrylates having the formula:

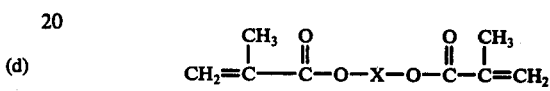

or

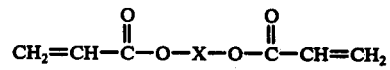

where X is:

a. $+CH_2+_n$ n = 1-20, or (b) 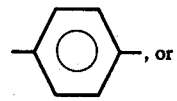 R = $C_1-C_8$ alkyl or $C_6-C_{20}$ aryl, or (c) 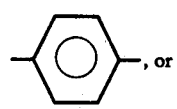, or d. $+CH_2-CH_2-O+_n CH_2-CH_2-$ n = 1-100.

The preferred monomer from this group is:

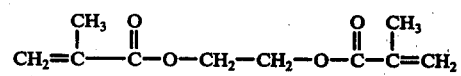

The second group of branching agents are diolefins having the formula:

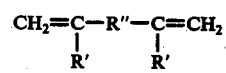

where R' is:
a. H, or
b. $C_1-C_8$ alkyl,

Where R" is:
a. $+CH_2+_n$ = 1-10, or (b) 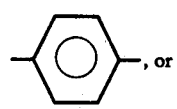, or

-continued

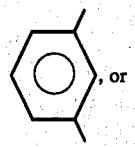, or (c)

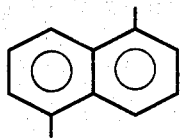 (d)

Preferred monomers from this group are:

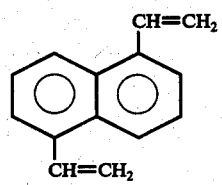    $CH_2=CH-CH_2-CH_2-CH=CH_2$

The third group of branching agents are olefin-acrylates having the formula:

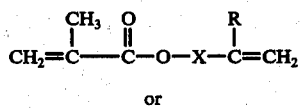

or

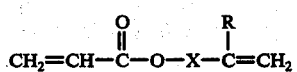

where X is:$-(CH_2)_n-$ n = 1–20 where R is:
a. H, or
b. $C_1-C_8$ alkyl, or
c. $C_6-C_{20}$ aryl. Preferred monomers from this group are:

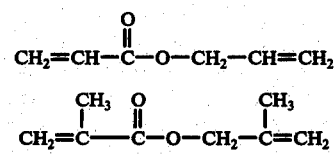

The amount of branching agent present can be 0.05–5.0 mole percent although 0.1–1.0 mole percent is the preferred amount. The greater the amount of branching agent present the lesser the cold flow under static conditions.

The preferred cure-site monomers, and the curing method for polymers containing each type are set forth below. Mixtures of cure-site monomers can also be used.

The first group of cure-site monomers have the formulas $CH_2=CHX$, $CH_2=CX_2$, or $CH_2=CH-CH_2X$, where X is chlorine or fluorine. Preferred monomers are vinyl chloride, vinylidene chloride, and allyl chloride. Copolymers of ethylene, alkyl acrylate, and monomers selected from this first group can be cured with aliphatic diamines, such as hexamethylenediamine carbamate, or aromatic polyhydroxy compounds, such as hydroquinone or bis-phenols.

Other preferred monomers include compounds of the formula:

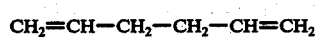

wherein $R_1$ and $R_2$ are independently selected from H, Cl, Br, a $C_1-C_8$ alkyl, phenyl, or naphthyl, $R_3$ is hydrogen, a $C_1-C_{10}$ alkyl, phenyl, or naphthyl, substituted phenyl or naphthyl wherein substituents are $C_1-C_{10}$ alkyl, halogen, nitro, and $C_1-C_{10}$ alkoxy groups. Both the cis and trans isomers of the compounds of formula (b) are contemplated. Preferably, $R_1$ and $R_2$ in the above formulae represent hydrogen.

Compounds representative of formula (a) include maleic anhydride and citraconic anhydride. Compounds representative of formula (b) include maleic acid, citraconic acid, fumaric acid, mesaconic acid, and mono-esters of maleic and fumaric acid, including the methyl, ethyl, isopropyl, propyl, butyl, tertbutyl, amyl, isoamyl, hexyl, octyl, decyl, phenyl, 1-naphthyl, 2-naphthyl, 2-methylphenyl, 2-ethylphenyl, 2,5-dimethylphenyl, 4-isopropylphenyl, 4-butylphenyl, 3,5-dimethyl-3-propylphenyl, 3-decylphenyl, 4-n-tetradecylphenyl, 4-n-hexadecylphenyl, 4-n-octadecylphenyl, 2-chlorophenyl, 4-methoxyphenyl, 3-nitrophenyl, 4-bromophenyl, 4-fluoro-2-hexyl, 2-chloro-1-naphthyl, 4-chloro-1-naphthyl, 6-chloro-1-naphthyl, 7,8-dichloro-1-naphthyl, 4-nitro-1-naphthyl, 4-bromo-1-naphthyl, 7-chloro-2-naphthyl, 4-methyl-1-naphthyl, and 1-propyl-2-naphthyl.

Especially preferred cure-site monomers represented by the above formula (b) are the monoalkyl esters of maleic and fumaric acid, such as the ethyl ester. Ethylene/ethyl acrylate terpolymers containing these monoalkylesters have achieved an excellent balance of scorch resistance and cure rate while being cured.

Copolymers containing an anhydride of the above formula (a) can be cured with diamines, calcium hydroxide, or a diepoxide. The diepoxide and diamines are preferred. Copolymers containing as a cure-site monomer an acid of above formula (b) can be cured with metal hydroxides, such as calcium hydroxide or preferably a diepoxide or diamines.

Other cure-site monomers include compounds of the formula:

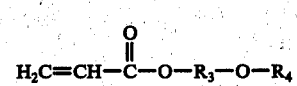

wherein $R_3$ is a $C_1-C_4$ alkylene, and $R_4$ is phenyl, naphthyl, thiophenyl or $C_1-C_4$ alkyl substituted derivatives thereof. A particularly preferred cure-site monomer is β-phenoxyethyl acrylate. That is, a compound of the above formula where $R_3$ is ethylene and $R_4$ is phenyl. Copolymers containing units derived from these monomers can be cured with formaldehyde catalyzed with an acid generator, such as isopropyltosylate.

Other preferred cure-site monomers are compounds of the formula

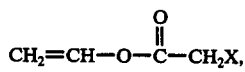

where X is chlorine, fluorine, or bromine. Also compounds of the formula

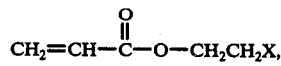

where X is chlorine, fluorine, or bromine. Particularly preferred monomers are vinylchloroacetate and 2-chloroethyl acrylate. Copolymers containing units derived from monomers having either of the above formulas can be cured with aliphatic diamines, such as hexamethylenediamine carbamate.

The copolymers of this invention can be cured by the usual techniques with the compounds mentioned. For example, the curing agent and copolymer are mixed on a roll mill or Banbury mixer. The resulting mixture is put in a mold, heated at about 150° C. to about 180° C. for about 10 minutes to about one hour, and at a pressure generally less than about 2000 psig. The resulting vulcanizate is then cooled and removed from the mold.

The copolymers of this invention have a glass transition temperature less than about 0° C. This makes the copolymers particularly useful as elastomers. Glass transition temperature for a given copolymer can be determined by methods well known in the art. It has been found that the cure-site monomer does not appreciably affect the glass transition temperature because they are present in relatively small amounts.

The copolymers of this invention when used to prepare elastomeric products can be processed with conventional rubber processing equipment in the same way as alphaolefin based elastomers, particularly those elastomers having broad molecular weight distribution. Typical of the rubber processing equipment used are roll mills, and internal mixers (such as Banbury mixers). Mixer loading, operating time and speeds, etc. will be obvious to those skilled in the art.

When the copolymers of this invention are blended with rubbers or other polymers, conventional compounding ingredients, such as carbon black, mineral fillers such as clay, coloring agents, extending oils and the like can be incorporated into the elastomeric composition. Preferably, no ingredients should be added which would reduce the resistance to oxidation, oil or thermal degradation.

The process of making this copolymer is to react ethylene and one or more alkyl acrylate and branching agents and optionally cure-site monomers with a Lewis acid and a free-radical polymerization initiator in an inert solvent.

Inert solvent means the solvent does not react with the reactants or the product. The solvent must be able to dissolve the reactants and the copolymer formed. Typical of suitable solvents are dichloromethane, chloroform, dichloroethane, benzene, toluene and chlorobenzene. Dichloromethane and dichloroethane are preferred.

Boron trifluoride is a Lewis acid that is useful in this invention. Equal, less than or more than equal amounts relative to the alkyl acrylate can be used. Less than a stoichiometric amount of the Lewis acid with respect to the alkyl acrylate should be avoided because the rate of polymerization decreases. The preferred embodiment has an equimolar amount.

If a cure-site monomer and a branching agent are present and if they are α-olefinic, the sum of the moles of ethylene, cure-site monomer, and branching agent used in the polymerization process should be equal to or greater than the moles of alkyl acrylate. If the cure-site monomer and the branching agent are acrylic, the sum of the moles of alkyl acrylate, cure-site monomer, and branching agent should be equal to or less than the moles of ethylene. It is preferred to have a molar excess of ethylene. A 2-10 fold excess of ethylene is particularly preferred. The amount of ethylene present during polymerization is dependent on the pressure and for a given pressure there is a maximum amount of ethylene which can be present in the polymerization process.

The amount of the alkyl acrylate present during the polymerization reaction is about 1 to about 20 mole percent based on moles of the solvent, preferably about 10 to about 15 mole percent.

The polymerization reaction is conducted in the presence of a free-radical polymerization initiator, such as an azo-initiator or an organic peroxide. Preferred initiators are benzoyl peroxide, azo-bisisobutyronitrile, and 2,2'-azobis(2-methylpropionitrile). The amount of the initiator is about 0.05 to about 5.0 parts for every 100 parts by weight of the alkyl acrylate or mixture of acrylates. The preferred embodiment contains about 0.1 to about 1.0 parts by weight of initiator. The initiator can be added to the reaction mass at the start of the reaction, or gradually as the reaction progresses. It is conveniently dissolved in the inert solvent before addition to the reactor.

The polymerization is conducted at about $-10°$ C. to 200° C., preferably 0° C. to about 100° C., most preferably about 25° C. to about 50° C. The pressure should be at least sufficient to keep the alkyl acrylate complexed with a Lewis acid. Pressures of from about 10 psig to about 10,000 psig (preferably about 100-1000 psig and, most preferably, 100 to about 500 psig) are used. Reaction time is a function of temperature and at higher temperatures the reaction it proceeds at a faster rate. For example, at 25° C., a typical polymerization will go to completion in about 120 minutes to about 180 minutes. At about 50° C., the same reaction will take only about 30 to about 60 minutes. The reaction is complete when the pressure stops dropping because no more ethylene is being consumed.

The apparatus to be used in practicing the process of this invention should be selected to withstand the operating temperatures and pressures. It is preferable to agitate the reaction mass to obtain better heat transfer and a more homogeneous product.

The atmosphere above the liquid reaction mass will be saturated with ethylene vapor. The sequence of addition of the reactants to the reaction vessel is not critical.

This invention can be done by a batch or a continuous process. In a batch process, liquids are added to a reactor, the reactor is closed, and the reactor is pressurized with a Lewis acid and ethylene.

After termination of the reaction, the copolymer can be isolated by conventional techniques, e.g., drum drying, or steam stripping. Boron trifluoride is easily removed from the product by drum drying or steam stripping. Another method of isolating the copolymer is by precipitating the copolymer from the solution with hexane.

The polymers of this invention are high molecular weight. Molecular weight is measured by the Wallace Plastimeter. The range of Wallace plasticity values is 5–100, with 15–40 being preferred.

This invention is further illustrated by the following specific examples. All parts, proportions, and percentages are by weight unless otherwise indicated.

EXAMPLES

GENERAL PROCEDURE

The Wallace plasticity is a measure of the amount of flow or deformation under load of unvulcanized elastomeric materials. The sample to be tested is pressed into a sheet 0.15 inch (3.81 mm) thick and cut into pellets. The test is made with a Wallace Plastimeter manufactured by H. W. Wallace and Co., Ltd., London. Initially, for a period of 10–15 seconds, the test pellet is compressed to a thickness of exactly 1 mm and heated to 100° C. The test pellet is then subjected to a 10-kg load for exactly 15 seconds at 100° C. The final thickness of the test piece, expressed in units of 0.01 mm, is the plasticity reading.

The cold-flow of an elastomeric composition is measured by a compression set device which operates on a cylindrical pellet of the composition about ¾ inch in diameter of about ¼ inch in height. The precise height, $t_o$, of the pellet is measured. After the pellet has been heated in an oven at 60° C for 20 minutes, it is transferred to the test apparatus (preheated to 60° C). During the 1-hour test the pellet is compressed on a flat metal surface by a 0.772 pound brass weight. The lower end of the weight has a diameter of 3 inches and a height of 5/16 inch. The pellet is placed below the center of the weight. The upper end of the brass weight is a stem having a length of 2.50 inchs and a diameter of 0.5 inch. This stem is positioned for free vertical movement within a hole in a plate parallel to the surface on which the pellet rests. During the test, the brass weight gradually settles as the polymer pellet flows. Initially the pressure on the polymer pellet is 1.75 lb/sq in but as the pellet flows, the surface area increases, causing the pressure to decrease. At the end of one hour, the sample is removed and its new height ($t$) is measured. The percent cold-flow (cold compression set) equals $$t_o - t/t_o \times 100$$

a high value indicating a high cold-flow and a low value indicating low cold-flow.

EXAMPLE 1

This example illustrates the use of allyl acrylate as a branching agent for ethylene/ethyl acrylate polymer.

A two-liter reactor was charged with 1500 ml dichloromethane, 100 g ethyl acrylate, 0.25 g allyl acrylate, 3.0 g 2-chloroethyl acrylate, 0.5 g a,a'-azobisisobutyronitrile. The reactor was evacuated (200 mm Hg) for 2 min., pressured with $BF_3$ to 517 mm Hg until saturated, evacuated again and pressured with 5170 mm Hg ethylene and heated to 40° C. Polymerization started within a few minutes and was completed in 60–70 min. The polymer solution was poured into a large kettle, the solvent removed by passing steam through the kettle and the polymer isolated as a crumb. The polymer crumb was washed in a blender with a 50:50 acetone-water mixture and dried in a vacuum oven to give 114 g polymer. The polymer was 25% soluble and the soluble fraction had an $\eta_{inh}$ 2.59 (0.1 gm/100 ml m-cresol, 30° C). The Wallace plasticity of the polymer was 23.0 and the % cold-flow 27.7.

The polymer composition expressed in units of mole percent was:

| | |
|---|---|
| ethyl acrylate | 48.8 |
| 2-chloroethyl acrylate | 1.1 |
| allyl acrylate | 0.1 |
| ethylene | 49.9 |

EXAMPLE 2

This example demonstrates that in the absence of the branching agent a soluble polymer of high cold-flow is obtained.

The procedure of Example 1 was repeated, except that the allyl acrylate was omitted. The polymer (100% soluble) had $\eta_{inh}$ 1.74, Wallace plasticity 10, and % cold-flow 73.6.

EXAMPLE 3

This example demonstrates that useful elastomeric products can be prepared from the branched polymer of Example 1.

The following were mixed on a mill, press cured at 180° C/30 min. and aged at 150° C/24 hrs:

100 parts polymer of Example 1
50 FEF black
1 hexamethylene diamine carbamate
1 stearic acid
5 dibasic lead phosphite
1 polymerized 1,2-dihydro-2,2,4-trimethylquionoline
 (sold as Agerite D by R. T. Vanderbilt Co., Inc.)

Tensile properties were as follows (determined by ASTM methods D 412, D 395):

| | | |
|---|---|---|
| $M_{100}$ | 500 | psi |
| $T_B$ | 1950 | psi |
| $E_B$ | 290% | |
| Permanent Set | 5% | |
| Compression Set (100° C/70 hrs) 46%. | | |

EXAMPLE 4

This example demonstrates another polymer composition branched with allyl acrylate.

A 3.8-liter reactor was charged with 3000 ml dichloromethane, 270 g ethyl acrylate, 6.0 g maleic acid monoethyl ester, 0.6 g allyl acrylate and 2.0 g 2,2-azobisisobutyronitrile. The procedure was the same as in Example 1 except 15500 mm Hg ethylene was maintained. There was obtained 351 g of polymer, $\eta_{inh}$ (0.1 gm/100 ml $CHCl_3$, 30° C) 3.06 (91% soluble), Wallace plasticity 30.5, ML-4 (212° F) 60 and % cold-flow 0.

A control experiment without allyl acrylate gave polymer having $\eta_{inh}$ 1.91, Wallace plasticity 17, ML-4 (212° F) 31 and % cold-flow 62.5.

The polymer composition expressed in units of mole percent was:

| | |
|---|---|
| ethyl acrylate | 49.1 |
| maleic acid monoethyl ester | 0.8 |
| allyl acrylate | 0.1 |
| ethylene | 49.9 |

EXAMPLE 5

This example demonstrates that ethylene dimethacrylate may also be used as a branching agent.

A 3.8-liter reactor was charged with 3500 ml methylene chloride, 323 g ethyl acrylate, 7.5 g maleic acid monoethyl ester, 0.5 g ethylene dimethacrylate and 3.0 g α,α'-azobisisobutyronitrile. The procedure was the same as in Example 1. There was obtained a polymer of $\eta_{inh}$ (0.1 gm/100 ml CHCl$_3$, 30° C) 2.32, Wallace plasticity 18, ML-4 (212° F.) 30 and % cold-flow 29. The polymer composition expressed in units of mole percent was:

| | |
|---|---|
| ethyl acrylate | 49.1 |
| maleic acid monoethyl ester | 0.8 |
| ethylene dimethacrylate | 0.05 |
| ethylene | 50.0 |

When 2.0 g ethylene dimethacrylate was used there was obtained a polymer, $\eta_{inh}$ 2.60, Wallace plasticity 29, ML-4 (212° F.) 52, % cold-flow 6.7. The polymer composition expressed in units of mole percent was:

| | |
|---|---|
| ethyl acrylate | 48.8 |
| maleic acid monoethyl ester | 0.8 |
| ethylene dimethacrylate | 0.2 |
| ethylene | 50.0 |

A control experiment without ethylene dimethacrylate gave polymer of $\eta_{inh}$ 1.91, Wallace plasticity 17, ML-4 (212° F.) 31, and % cold-flow 62.5.

I claim:

1. An amorphous atactic alternating branched copolymer having a glass transition temperature of less than 0° C obtained by addition polymerization by polymerizing in the presence of a Lewis acid and free radical initiator, said copolymer having repeating units of —A—B— wherein A is the polymerized unit of the ethylenically unsaturated carbon-carbon bond of the group

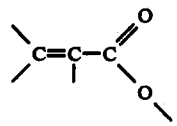

contained in a compound selected from the class consisting of:
1. ethyl acrylate,
2. ethylene glycol diacrylate,
3. maleic acid monoethyl ester, and B is the polymerized unit of the ethylenically unsaturated carbon-carbon bond of ethylene, wherein the total amount of (2) present is 0.05 t 5 mole percent; the amount of (3) present is either none or 1 to 10 mole percent; and the amount of (1) and ethylene present is complemental.

2. An amorphous atactic alternating branched copolymer having a glass transition temperature of less than 0° C obtained by addition polymerization by polymerizing in the presence of a Lewis acid and free radical initiator, said copolymer having repeating units of —A—B— wherein A is the polymerized unit of the ethylenically unsaturated carbon-carbon bond of the group

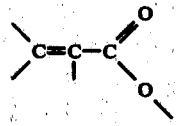

contained in a compound selected from the class consisting of:
1. ethyl acrylate,
2. maleic acid monoethyl ester,
3. allyl acrylate; and B is the polymerized unit of the ethylenically unsaturated carbon-carbon bond of the group $CH_2 = C<$ contained in a compound selected from the class consisting of:
4. ethylene,
5. allyl acrylate; wherein the total amount of (3) or (5) present is 0.05 to 5 mole percent; the amount of (2) present is either none or 1 to 10 mole percent; and the amount of (1) and (4) present is complemental.

3. An amorphous atactic alternating branched copolymer having a glass transition temperature of less than 0° C obtained by addition polymerization by polymerizing in the presence of a Lewis acid and free radical initiator, said copolymer having repeating units of —A—B— wherein A is the polymerized unit of the ethylenically unsaturated carbon-carbon bond of the group contained in a compound selected from the class consisting of:
1. ethyl acrylate,
2. allyl acrylate,
3. chloroethyl acrylate; and B is the polymerized unit of the ethylenically unsaturated carbon-carbon bond of the group $CH_2 = C<$ contained in a compound selected from the class consisting of:
4. ethylene,
5. allyl acrylate; wherein the total amount of (2) or (5) present is 0.05 to 5 mole percent; the amount of (3) present is either none or 1 to 10 mole percent; and the amount of (1) and (4) present is complemental.

* * * * *